(12) United States Patent
Hasegawa et al.

(10) Patent No.: US 7,682,741 B2
(45) Date of Patent: Mar. 23, 2010

(54) COMPOSITE PARTICLE FOR LITHIUM RECHARGEABLE BATTERY, MANUFACTURING METHOD OF THE SAME, AND LITHIUM RECHARGEABLE BATTERY USING THE SAME

(75) Inventors: Masaki Hasegawa, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 941 days.

(21) Appl. No.: 11/441,031

(22) Filed: May 26, 2006

(65) Prior Publication Data

US 2007/0003835 A1    Jan. 4, 2007

(30) Foreign Application Priority Data

Jun. 29, 2005    (JP)    ............................. 2005-189408

(51) Int. Cl.
*H01M 4/58* (2006.01)
*H01M 4/88* (2006.01)

(52) U.S. Cl. ................................. 429/218.1; 252/182.1
(58) Field of Classification Search ................. 429/128, 429/209, 218, 226, 231.9, 231.95, 245
See application file for complete search history.

(56) References Cited

U.S. PATENT DOCUMENTS 5,556,721 A    9/1996    Sasaki et al.
5,702,845 A *    12/1997    Kawakami et al. .......... 429/224
2003/0039891 A1    2/2003    Nitta et al.
2004/0214085 A1 *    10/2004    Sheem et al. ............ 429/218.1

FOREIGN PATENT DOCUMENTS

| JP | 07-029602 A | 1/1995 |
| JP | 08-321300 A | 12/1996 |
| JP | 2001-291512 A | 10/2001 |
| JP | 2003-303588 A | 10/2003 |

* cited by examiner

*Primary Examiner*—Dah-Wei D Yuan
*Assistant Examiner*—Stephan Essex
(74) *Attorney, Agent, or Firm*—McDermott Will & Emery LLP

(57) ABSTRACT

A composite particle for a lithium rechargeable battery is contained in at least one of a positive electrode and a negative electrode of the lithium rechargeable battery that includes the positive electrode, the negative electrode, a separator, and non-aqueous electrolytic solution. The composite particle contains a conductive agent and an active material that can reversibly store and emit lithium ions. The composite particle is a hollow body formed of an outer wall including the active material and conductive agent, and a cavity capable of retaining non-aqueous electrolytic solution. At least one opening of the cavity that can pass the electrolytic solution is formed in the surface of the composite particle.

6 Claims, 2 Drawing Sheets

COMPOSITE PARTICLE FOR LITHIUM RECHARGEABLE BATTERY, MANUFACTURING METHOD OF THE SAME, AND LITHIUM RECHARGEABLE BATTERY USING THE SAME

BACKGROUND OF THE INVENTION

1. Field of the Invention

The present invention relates to a lithium rechargeable battery, a composite particle for the lithium rechargeable battery, and a manufacturing method of the composite particle for the lithium rechargeable battery, more specifically to a technology for making composite particles of an active material having significant volume change.

2. Background Art

A lithium rechargeable battery is used as a main power source of a mobile communication device and a portable electronic device, because the battery has high energy density at a high voltage. In response to downsizing and performance improvement of the devices, the lithium rechargeable battery is required to also have higher performance, and many studies have been performed.

Many materials have been proposed as positive and negative active electrode materials of a lithium rechargeable battery. Various new materials have been studied as a negative electrode active material that allows further increase of the capacity. For example, in Japanese Patent Unexamined Publication No. H07-029602 and Japanese Patent Unexamined Publication No. 2001-291512, as a negative electrode material, single metal such as silicon (Si) and tin (Sn) capable of storing and emitting lithium ions, or alloys of these metals are proposed.

However, powder made of metals such as Si and Sn or an alloy thereof significantly expands and contracts in response to the storage and emission of lithium ions in charging and discharging reactions. Distortion due to the expansion and contraction degrades the conductive network in a mixture containing an active material, and reduces the battery characteristic. Therefore, Japanese Patent Unexamined Publication No. 2003-303588 discloses an example where a composite particle having a porous structure including clearances is formed of active material particles and the expansion of the composite particle by the active material particles is absorbed. In such a composite particle, however, only pores with a micro diameter exist homogeneously, and the active material particles are in tight contact with each other. Therefore, there is no spatial allowance for absorbing rapid expansion of the active material particle to moderate the expansion of the composite particle.

While, Japanese Patent Unexamined Publication No. H08-321300, for example, discloses an active material particle having a cavity formed in its center and a pore connecting to the cavity. The cavity formed in the particle can efficiently absorb distortion by expansion and contraction of the active material particle, and the high-rate charge and discharge characteristics seems to be improved by retaining electrolytic solution in the cavity.

This active material is made of carbonaceous material, and a so-called fine pore with a diameter of 1/10 or shorter of the active material particle diameter connects to the cavity. Therefore, when the active material particle is made of carbonaceous material that undergoes small expansion, such a particle structure presents no problem. When material that undergoes significant expansion is used as the active material, the expansion of the active material causes the fine pore to be blocked even when the cavity moderates the expansion and contraction of the active material. As a result, a part in contact with the electrolytic solution stored in the cavity separates from an ion conductive network. Therefore, a sufficient characteristic is not obtained especially in high-rate charge or discharge.

SUMMARY OF THE INVENTION

A composite particle for a lithium rechargeable battery of the present invention is contained in at least one of a positive electrode and a negative electrode of the lithium rechargeable battery that includes the positive electrode, the negative electrode, a separator, and non-aqueous electrolytic solution. The composite particle contains a conductive agent and an active material that can reversibly store and emit lithium ions. The composite particle is a hollow body formed of a cavity capable of retaining the non-aqueous electrolytic solution and an outer wall including the active material and the conductive agent. At least one opening of the cavity through which the electrolytic solution can enter and leave is formed in the surface of the composite particle. The composite particle for the lithium rechargeable battery of the present invention is a hollow body including the conductive agent around the active material, and the hollow body is formed by combining the active material and the conductive agent undergoing no expansion. The composite particle can therefore, internally absorb the volume change of the active material. Additionally, an opening having a sufficient area is formed in the surface of the composite particle so that the electrolytic solution in the cavity of the composite particle is not isolated when the active material expands. Therefore, the ion conductive network is secured. Thus, a lithium rechargeable battery of high performance can be stably provided. The manufacturing method of a composite particle for a lithium rechargeable battery of the present invention comprises the following steps:

a first step of producing mixed dispersion liquid of a conductive agent and an active material capable of reversibly storing and emitting lithium ions; and a second step of producing a composite particle made of the active material and the conductive agent having a cavity and an opening by spraying and drying the mixed dispersion liquid.

Here, the cavity retains non-aqueous electrolytic solution, and the opening is formed in the surface of the composite particle and allows the non-aqueous electrolytic solution to enter and leave. Thus, the composite particle described above can be prepared.

DETAILED DESCRIPTION OF THE INVENTION

Figure 1:
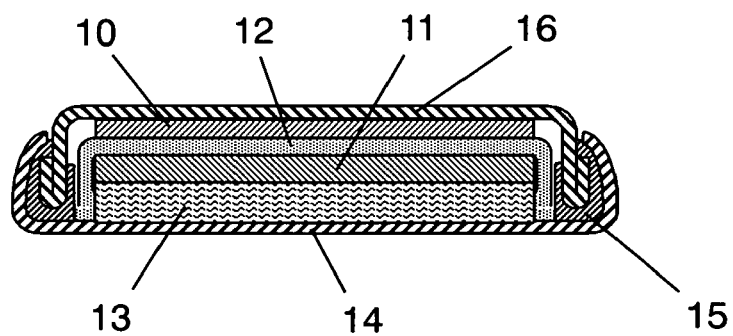
FIG. 1 is a schematic sectional view of an example of a lithium rechargeable battery employing a composite particle in accordance with an exemplary embodiment of the present invention.
Figure 2:
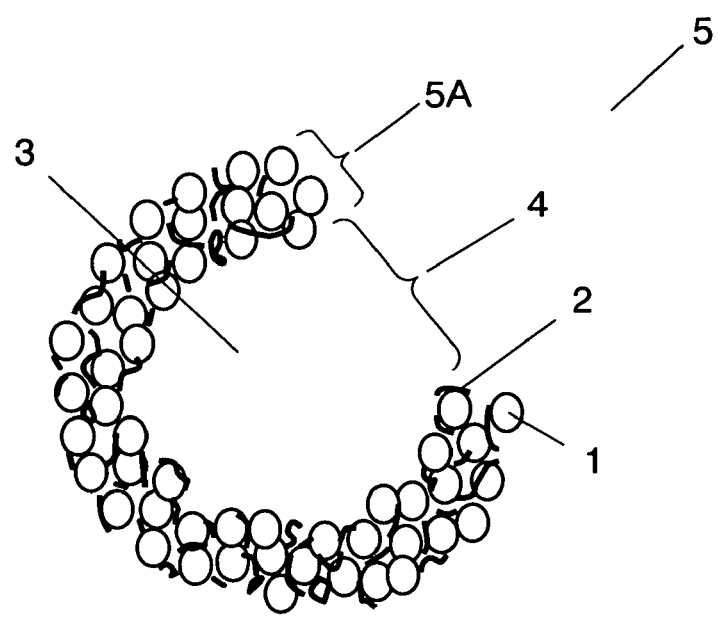
FIG. 2 is a schematic sectional view of the composite particle in accordance with the exemplary embodiment of the present invention.

FIG. 1 is a schematic sectional view of an example of a lithium rechargeable battery employing a composite particle in accordance with an exemplary embodiment of the present invention. FIG. 2 is a schematic sectional view of the composite particle in accordance with the exemplary embodiment of the present invention.

Electrode 10 contains composite particle 5 shown in FIG. 2. Electrode 10 and counter electrode 11 are faced to each other via separator 12 to form an electrode group. For example, electrode 10 is a positive electrode and counter electrode 11 is a negative electrode, or electrode 10 is a negative electrode and counter electrode 11 is a positive electrode. The electrode group is inserted into case 14, and non-aqueous electrolytic solution is poured into it. Then, sealing plate 16 is put on case 14, and case 14 is caulked with respect to sealing plate 16 via gasket 15 disposed on the inner periphery of case 14, thereby forming a lithium rechargeable battery having a sealed structure.

The shape of the battery may be any shape as long as it has a laminated structure, for example a coin shape, a seat shape, a rectangular shape, or a large type used for an electric automobile or the like. The lithium rechargeable battery of the present embodiment can be used in a portable information terminal, a portable electronic device, a small-scale power storage system for home use, a motorcycle, an electric automobile, or a hybrid electric automobile, but is not limited to these.

Regarding the non-aqueous electrolytic solution, as the salt, various lithium compounds such as $LiPF_6$ and $LiBF_4$ can be used. As the solvent, ethylene carbonate (EC), dimethyl carbonate (DMC), diethyl carbonate (DEC), and ethyl methyl carbonate (EMC) may be individually used, or a combination of them may be used. As the separator, a micro porous film made of polyolefin can be used. Case 14 is made of a material that is electrochemically stable in an operating voltage range of the lithium rechargeable battery. Case 14 is preferably made of iron or aluminum, but may be plated with nickel or Sn.

As shown in the schematic sectional view of FIG. 2, composite particle 5 formed of conductive agent 2 and active material 1 capable of reversibly storing and emitting lithium ions has cavity 3 in its center. In other words, composite particle 5 formed of a hollow body has outer wall 5A including active material 1 and conductive agent 2, and cavity 3 capable of retaining the non-aqueous electrolytic solution is formed inside outer wall 5A. Further, at least one opening 4 is formed in the surface of composite particle 5. The opening 4 communicates with cavity 3, and allows the electrolytic solution to come into and go out of cavity 3 even in a state where active material 1 stores the lithium ions.

For putting the battery with active material 1 that has large capacity density and hence significantly expands to practical use, it is necessary to make a structure where a particle containing active material 1 internally absorbs volume change and can secure the ion conductive network. The above-mentioned structure of composite particle 5 allows the satisfaction of the above-mentioned requirement.

Here, "active material having large capacity density" means an active material that undergoes higher volume expansion due to charge and discharge than that of a conventional active material, or of which ion conductivity is apt to reduce due to the volume expansion. In the positive electrode active material, the theoretical capacity density is equivalent to or higher than that of $LiCoO_2$ (274 mAh/g) as the conventional active material, and the volume ratio and the ratio of crystal lattice constant in at least one axial direction between the charged state and discharged state are 1.1 or higher. Specifically, as the positive electrode active material, composite oxide such as $LiCoO_2$, its modified oxide, $LiNiO_2$, its modified oxide, $LiMn_2O_4$, and its modified oxide can be used.

In the negative electrode active material, the theoretical capacity density is higher than that of carbonaceous material as the conventional active material, namely the theoretical capacity density is 400 mAh/g or higher, and the ratio between the volume in the charged state and that in the discharged state is 1.2 or higher. Specifically, as the negative electrode active material, at least one selected from Si, Si-containing alloy, oxide mainly containing Si, Sn, Sn-containing alloy, oxide mainly containing Sn is used. The volume change of the negative electrode active material between the charged state and discharged state is generally more significant than that of the positive electrode active material, so that it is effective to apply the present invention to the negative electrode material. Especially, Si, Si-containing alloy, oxide mainly containing Si, Sn, Sn-containing alloy, and oxide mainly containing Sn have high theoretical capacity density, but commonly, disadvantageously undergo significant volume change. Thus, they are preferable application objects of the present invention.

In particular, the Si-containing alloy containing metal selected from titanium (Ti), iron (Fe), cobalt (Co), nickel (Ni), and copper (Cu) has a density higher than those of the other active materials, and provides high energy density. Thus, these materials are more preferable application objects of the present invention.

The Si-containing alloys are preferably produced by a mechanical alloying method. The Si-containing alloy produced by a mechanical alloying method has high capacity density, and hence is the most preferable application object of the present invention.

Figure 3:
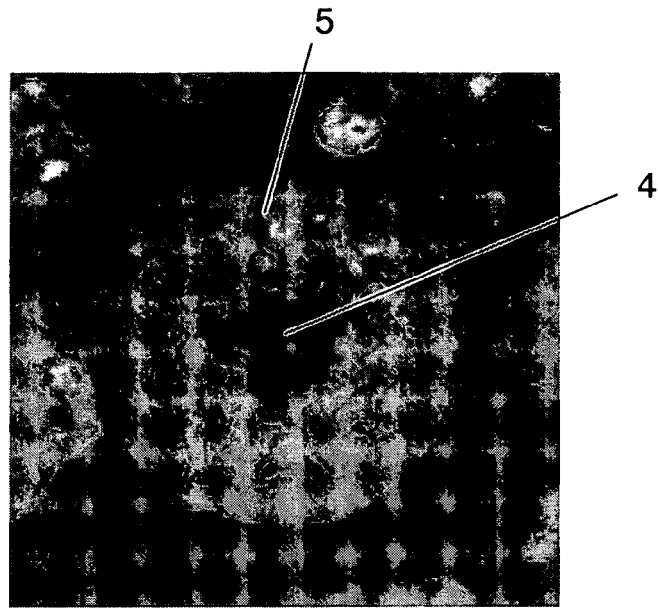
FIG. 3 is an appearance photograph with an electron microscope of the composite particle in accordance with the exemplary embodiment of the present invention.

FIG. 3 is an appearance photograph with an electron microscope of one example of composite particle 5 shown in FIG. 2. This photograph shows composite particle 5 of 22 wt % Ti-78 wt % Si alloy as active material 1 and acetylene black (AB) as conductive agent 2, and opening 4 communicating with cavity 3 can be recognized in the center.

Figure 4:
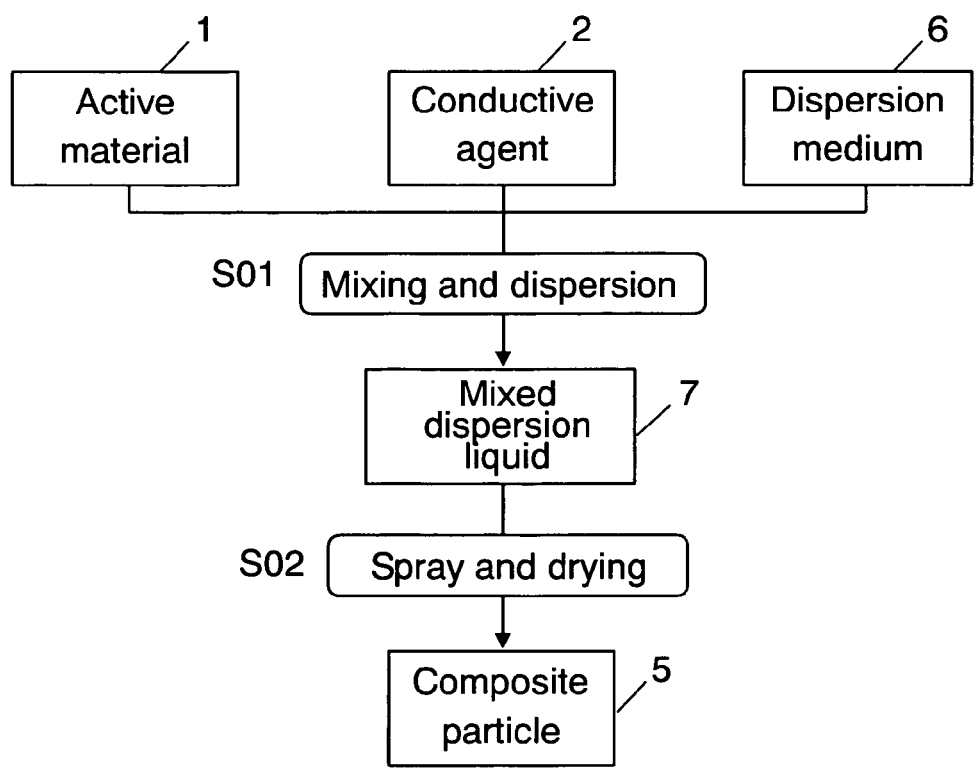
FIG. 4 is a diagram showing a preparing method of the composite particle in accordance with the exemplary embodiment of the present invention.

Next, the preparing method of composite particle 5 is described with reference to FIG. 4. First, mixed dispersion liquid 7 containing active material 1, conductive agent 2, and dispersion medium 6 is prepared (S01). A binding agent may be added as required. Then, mixed dispersion liquid 7 is sprayed and dried (S02). Composite particle 5 having cavity 3 retaining non-aqueous electrolytic solution and opening 4 allowing the electrolytic solution to come into and go out of cavity 3 is composed of active material 1 and conductive agent 2. At this time, by drying mixed dispersion liquid 7 so that composite particle 5 partly breaks, opening 4 is formed. When mixed dispersion liquid 7 is sprayed and dried, dispersion medium 6 contained in the composite particle formed in the spray process is gradually evaporated. In such a manufacturing method, composite particle 5 is manufactured as a hollow body including cavity 3 retaining non-aqueous electrolytic solution The diameter of composite particle 5 is preferably at least 0.1 μm and at most 50 μm, more preferably at least 1 μm and at most 20 μm. When the particle diameter is excessively small, it is difficult to handle composite particle 5 in the manufacturing process. When the particle diameter is excessively large, the filling density of the electrode mixture reduces. The particle diameter can be controlled in response to the spray condition. More specifically, the concentration of sprayed mixed dispersion liquid 7 is increased or the droplet is enlarged, thereby increasing the particle diameter.

The average maximum diameter of active materials 1 is preferably at least 0.05 μm and at most 1 μm. When the average maximum diameter of active materials 1 is shorter than 0.05 μm, the clearance between active materials 1 is excessively small. When the average maximum diameter exceeds 1 μm, the clearance between active materials 1 is excessively large. In either of these two cases, it is difficult to obtain composite particle 5. By adjusting the average maximum diameter of active materials 1 to the above-mentioned range, composite particle 5 can be precisely manufactured.

Generally, in a powder producing method by spraying and drying by a spray dry method or the like, the spray condition can variously controlled. While, regarding the dry condition, the internal volume of an employed facility can be controlled, but the number of controllable items is small. Therefore, the particle diameter of the raw material and the solid content weight percent of mixed dispersion liquid 7 significantly affect the dry condition. More specifically, when the average maximum diameter of active materials 1 is shorter than 0.05 μm, the clearance between active materials 1 is excessively small, and dispersion medium 6 contained in composite particle 5 formed in the spray process is hardly released to the outside of composite particle 5 in the dry process. The evaporation rate of dispersion medium 6 therefore becomes excessively higher than the release rate. As a result, expansion of the vapor of dispersion medium 6 is apt to break composite particle 5. On the contrary, when the average maximum diameter of active materials 1 exceeds 1 μm, the clearance between active materials 1 is excessively large, and dispersion medium 6 contained in composite particle 5 formed in the spray process is apt to be released to the outside of composite particle 5 in the dry process. The release rate of dispersion medium 6 therefore becomes excessively higher than the evaporation rate thereof, and the partial breakage in the dry process, which is an essential phenomenon to form appropriate opening 4, hardly occurs. Thus, the average maximum diameter of active materials 1 is preferably in the range of 0.05 through 1 μm. By setting the diameter in the range, composite particles 5 can be mass-produced precisely.

The solid content weight percent of mixed dispersion liquid 7 is preferably at least 2% and at most 10%. As discussed above, in the powder producing method by spraying and drying, the solid content weight percent of mixed dispersion liquid 7 significantly affects the dry condition. Specifically, when the solid content weight percent of mixed dispersion liquid 7 is less than 2%, the drying finishes excessively fast and hence the partial breakage hardly occurs in the drying process. On the contrary, when the solid content weight percent of mixed dispersion liquid 7 exceeds 10%, much vapor of dispersion medium 6 accumulates inside composite particle 5 and hence composite particle 5 is apt to break. Therefore, the solid content weight percent of mixed dispersion liquid 7 is preferably in the range of 2 through 10%. By setting the solid content in the range, composite particles 5 can be therefore mass-produced precisely.

Assuming that the maximum diameter of composite particle 5 is A, the maximum diameter of cavity 3 is B, and the maximum diameter of opening 4 is C, the relation A>B≧C is satisfied. The relation B=C is satisfied when the sectional shape of cavity 3 is a substantial rectangle or a trumpet shape. In controlling the shape of cavity 3, generally, the relation B=C is apt to be satisfied when dispersion medium 6 apt to vaporize is employed, or the relation B>C is apt to become remarkable when dispersion medium 6 that hardly vaporizes is employed.

The maximum diameter of cavity 3 is preferably set in the range of 20 through 80% of that of composite particle 5, and the maximum diameter of opening 4 is set in the range of 15 through 80% of that of composite particle 5. When the maximum diameters of cavity 3 and opening 4 exceed 80% of that of composite particle 5, composite particle 5 is brittle structurally. This case is not preferable because the manufacturing is difficult and composite particle 5 is broken by repetition of charge and discharge. When the maximum diameter of cavity 3 is shorter than 20% of that of composite particle 5, the amount of containable non-aqueous electrolytic solution is small, and the ion conductivity inside the composite particle 5 cannot be increased. When the maximum diameter of opening 4 is shorter than 15% of that of composite particle 5, the expansion of active material 1 easily blocks opening 4. In this case, even when composite particle 5 can contain non-aqueous electrolytic solution, active material 1 on the inner face of cavity 3 is disadvantageously separated from the ion conductive network of the whole battery. The above-mentioned structure can bring about the advantage of the present invention in a balanced manner.

Conductive agent 2 of 2 through 50 parts-by-weight is preferably contained in active material 1 of 100 parts-by-weight. Conductive agent 2 applies electron conductivity to composite particle 5 and absorbs volume change of active material 1. When the amount of conductive agent 2 is excessively small, the electron conductivity decreases, the volume change of composite particle 5 becomes remarkable, and hence composite particle 5 becomes slightly brittle structurally. On the contrary, when the amount of conductive agent 2 is excessively large, the percentage of active material 1 decreases, and hence the battery capacity decreases. Moreover, the viscosity of mixed dispersion liquid 7 used as a precursor of composite particle 5 excessively increases. Therefore, it is difficult to obtain composite particle 5 by spraying. By setting the above-mentioned mixing range, composite particle 5 can realize the advantage of the present invention while keeping high capacity.

Conductive agent 2 may be made of general electron conductive material. For example, the following materials can be used:

a graphite material such as natural graphite (scaly graphite or the like), artificial graphite, and exfoliated graphite;

a carbon black material such as AB, Ketjen black, channel black, furnace black, lamp black, and thermal black;

a conductive fiber material such as carbon fiber and metal fiber;

a metal powder material such as copper and nickel; and an organic conductive material such as polyphenylene derivative.

Employing at least one of the conductive agents can realize the advantage of the present invention.

The binding agent (not shown) employed in composite particle 5 may be made of a stable resin material in the operating electric potential range of the lithium rechargeable battery. The binding agent is made of, for example, styrene-butadiene rubber, polyvinylidene fluorite (PVDF), polyacrylic acid, sodium polyacrylate, polymethacrylic acid, sodium polymethacrylate, ethylene-acrylic acid copolymer, ethylene-sodium acrylate copolymer, ethylene-methacrylic acid copolymer, ethylene-sodium methacrylate copolymer, ethylene-methyl acrylate copolymer, sodium ion ($Na^+$) crosslinked materials of the above-mentioned materials, ethylene-methyl methacrylate copolymer, or carboxymethyl cellulose.

When such composite particle 5 is used in at least one of the positive electrode and negative electrode, composite particle 5 internally absorbs volume change and secures the ion conductive network. As a result, a lithium rechargeable battery having high specific capacity and a charge-discharge cycle characteristic can be obtained.

The advantage of the present invention is described in more detail with reference to specific examples. However, the present invention is not limited to these examples.

First, the study results of the average maximum diameter of active materials 1, the solid content weight percent of mixed dispersion liquid 7, the maximum diameter of composite particle 5, and the relation between the maximum diameters of cavity 3 and opening 4 and the maximum diameter of composite particle 5 are shown.

As a negative electrode active material, 22 wt % Ti-78 wt % Si alloy formed by the mechanical alloying method is prepared. An electron diffraction method employing a transmission electron microscope device shows that the synthesized negative electrode active material has two phases of TiSi$_2$ alloy and Si. The negative electrode active material is crushed with a vibration mill and a bead mill device, and the crushed particles are classified to provide six kinds of active materials 1 with average maximum diameters of 0.03, 0.05, 0.1, 0.3, 1.0, and 1.1 μm.

Next, active material 1 of 100 parts-by-weight and acetylene black of 10 parts-by-weight as conductive agent 2 are put into aqueous solution of polyacrylic acid (10 parts-by-weight as solid content) as the binding agent, and are dispersed sufficiently. Thus, mixed dispersion liquid 7 used as raw material of composite particle 5 is prepared. By adding water as dispersion medium 6, the solid content weight percent of mixed dispersion liquid 7 is adjusted to 1, 2, 5, 10 or 12% to provide a total of 30 kinds of mixed dispersion liquid 7. Each composite particle 5 is prepared by the spray dry method using each one kind of mixed dispersion liquid 7. They are called as samples 1 through 30.

Sample 31 is prepared similarly to samples 1 through 30 except for the condition where the 22 wt % Ti-78 wt % Si alloy with an average maximum diameter of 1.7 μm is used as the negative electrode active material and the solid content weight percent of mixed dispersion liquid 7 is set as 15%.

The average maximum diameters (median diameters) of active materials 1 as the raw material and of obtained composite particles 5 are measured by a measuring device of micro-track particle diameter distribution. The maximum diameter of opening 4 in the surface of composite particle 5 is observed and determined under constant magnification by a scanning electron microscope. The maximum diameter of cavity 3 inside composite particle 5 is observed and determined under constant magnification by the scanning electron microscope after composite particle 5 is buried in epoxy resin and is then cut and polished so that the cross section is seen. Table 1 shows specifications of each sample.

TABLE 1

| percent of mixed dispersion liquid (%) | 0.03 | 0.05 | 0.10 | 0.50 | 1.00 | 1.10 | 1.70 |
|---|---|---|---|---|---|---|---|
| 1 | Sample 1 broken | Sample 2 1.5 / 85 / 61 | Sample 3 2 / 82 / 55 | Sample 4 2.5 / 72 / 38 | Sample 5 3.5 / 51 / 22 | Sample 6 4 / 45 / 16 | |
| 2 | Sample 7 broken | Sample 8 2 / 80 / 54 | Sample 9 2.5 / 77 / 50 | Sample 10 3.5 / 59 / 32 | Sample 11 5 / 37 / 18 | Sample 12 5 / 33 / 14 | |
| 5 | Sample 13 broken | Sample 14 4 / 73 / 50 | Sample 15 5 / 69 / 46 | Sample 16 7 / 45 / 32 | Sample 17 9 / 20 / 16 | Sample 18 9 / 16 / 12 | |
| 10 | Sample 19 broken | Sample 20 8 / 55 / 40 | Sample 21 11 / 50 / 37 | Sample 22 15 / 33 / 25 | Sample 23 20 / 20 / 15 | Sample 24 20 / 16 / 10 | |
| 12 | Sample 25 7 / 56 / 41 | Sample 26 11 / 43 / 34 | Sample 27 14 / 36 / 29 | Sample 28 21 / 22 / 17 | Sample 29 31 / 18 / 12 | Sample 30 27 / 14 / 8 | |
| 15 | | | | | | | Sample 31 24 / — / — |

Upper row: maximum diameter of composite particle (μm)
Medium row: ratio of maximum diameter of cavity/maximum diameter of composite particle (%)
Lower row: ratio of maximum diameter of opening/maximum diameter of composite particle (%)

As shown in Table 1, when the maximum diameter of active material 1 is shorter than 0.05 μm and the solid content weight percent of mixed dispersion liquid 7 is low, composite particle 5 is broken just after production (See samples 1, 7, 13 and 19). In sample 31 where the maximum diameter of active material 1 is 1.7 μm and the solid content weight percent of mixed dispersion liquid 7 reaches 15%, cavity 3 and opening 4 cannot be disposed in composite particle 5.

Each composite particle 5 is evaluated using a model cell that includes electrode 10 produced using a part of composite particle 5 and lithium (Li)-made counter electrode 11 faced to electrode 10. Electrode 10 of the model cell has a low charge and discharge potential, and is used as a negative electrode in a ordinary battery. In this model cell, however, Li is used as counter electrode 11 in order to evaluate electrode 10. In this case, the charge and discharge potential of Li is lower than that of electrode 10, so that electrode 10 is treated as a positive electrode. The structure of the model cell thus differs from that of an actual battery. In the following description, lithium ions are released from electrode 10 when the cell is charged. This reaction is equivalent to a discharge reaction in the actual battery that employs electrode 10 as the negative electrode.

In producing cell A, composite particle 5 of sample 2, AB as the conductive agent, and PVDF as the binding agent are mixed at weight percent of 100:3:5. N-methyl pyrolidone as dispersion medium 6 is added to the mixture, and they are dispersed and kneaded to produce slurry. This slurry is applied to a copper foil collector using a doctor blade, is dried, and is then rolled to form a sheet. The sheet is cut in a circular shape with a diameter of 1.8 cm, and electrode 10 with a theoretical capacity of 5 mAh is produced.

A coin-shaped model cell shown in FIG. 1 is produced using electrode 10. In other words, an electrode group is formed of electrode 10 and counter electrode 11 via separator 12 made of a porous polyethylene sheet. Copper-made spacer 13 for adjusting the thickness is disposed between counter electrode 11 and case 14. As the non-aqueous electrolytic solution, solution is used where lithium hexafluorophosphate with a concentration of 1 mol·dm$^{-3}$ is dissolved in mixed solvent of EC and DEC with a volume ratio of 1:1. The non-aqueous electrolytic solution is poured, then case 14 is sealed with a sealing plate 16 via gasket 15, and a coin-shaped model cell of 2320 size is produced. The model cell produced above is used as cell A.

In producing cells B through J, composite particle 5 of sample 2 is changed to composite particle 5 of samples 8, 12, 15, 16, 17, 22, 24, 29 and 31, respectively. The model cells are produced similarly to cell A except for this operation.

In producing cell K, as the active material, the 22 wt % Ti-78 wt % Si alloy with an average maximum diameter similar to that of sample 15 is used. Slurry is produced by adding active material of 100 parts-by-weight, AB of 3.6 parts-by-weight, and PVDF of 6 parts-by-weight. A model cell is thus produced similarly to cell D, except for the condition where no composite particle is formed and polyacrylic acid is not used.

A plurality of cells A through K are produced respectively, and are evaluated in the following method. Here, counter electrode 11 is handled as a negative electrode.

In a first cycle, each cell is discharged to 0 V at 1 mA so as to make electrode 10 to store lithium ions, and then charged to 1.0 V at 1 mA. In a second cycle, each cell is discharged and charged in the same procedure. In a third cycle, each cell is discharged to 0 V at 10 mA, and then charged to 1.0 V at 1 mA. The ratio of discharge capacity in the third cycle to that in the second cycle is called a high-rate discharge characteristic. This characteristic affects a high-rate charge characteristic of the actual battery.

In a first cycle, each cell is discharged to 0 V at 1 mA, and then charged to 1.0 V at 1 mA. In a second cycle, each cell is discharged and charged in the same procedure. In a third cycle, each cell is discharged to 0 V at 1 mA, and then charged to 1.0 V at 10 mA. The ratio of charge capacity in the third cycle to that in the second cycle is called a high-rate charge characteristic. This characteristic affects a high-rate discharge characteristic of the actual battery.

Charge and discharge are performed in 100 cycles using the pattern that each cell is discharged to 0 V at 1 mA and then charged to 1.0 V at 1 mA. The ratio of charge capacity in the 100th cycle to that in the second cycle is called a cycle characteristic. The evaluation results by those methods are shown in Table 2.

TABLE 2

| Cell No. | Composite particle No. | High-rate discharge characteristic (%) | High-rate charge characteristic (%) | Cycle characteristic (%) |
| --- | --- | --- | --- | --- |
| A | 2 | 42 | 55 | 62 |
| B | 8 | 64 | 67 | 91 |
| C | 12 | 35 | 40 | 82 |
| D | 15 | 66 | 68 | 93 |
| E | 16 | 64 | 66 | 89 |
| F | 17 | 56 | 58 | 72 |
| G | 22 | 62 | 64 | 82 |
| H | 24 | 30 | 32 | 48 |
| I | 29 | 41 | 43 | 53 |
| J | 31 | 26 | 27 | 38 |
| K | Not composited | 30 | 32 | 40 |

In cell B and cells D through G, the maximum diameter of cavity 3 is 20 through 80% of that of composite particle 5, and the maximum diameter of opening 4 is 15 through 80% of that of composite particle 5. As shown in FIG. 2, these cells have high high-rate charge and discharge characteristics and a high cycle characteristic, comparing with cell J employing a composite particle having no cavity 3 and no opening 4 and cell K employing no composite particle.

In cell A where the maximum diameter of cavity 3 exceeds 80% of that of composite particle 5, the high-rate discharge characteristic and the cycle characteristic remarkably decrease. When cell A after evaluation is decomposed, the breakage of composite particle 5 is observed. It is considered that composite particle 5 of sample 2 used for cell A is broken by expansion of active material 1 due to repetition of storing and emitting of lithium ions, because outer wall 5A formed of active material 1 and conductive agent 2 is excessively thin. When composite particle 5 cannot respond to volume change during charge or discharge and is broken, active material 1 changes in volume at random. Therefore, the advantage of the present invention cannot be exhibited.

In cell C employing composite particle 5 of sample 12 where the maximum diameter of opening 4 is shorter than 15% of that of composite particle 5, the high-rate charge and discharge characteristics remarkably decrease. That is considered to be because opening 4 is excessively small and hence the volume change of active material 1 due to charge restricts the coming and going of non-aqueous electrolytic solution. Such composite particle 5 does not substantially have opening 4 that can pass the electrolytic solution in the state where active material 1 stores lithium ions, so that the advantage of the present invention is not exhibited.

In cells H and I employing composite particle 5 where the ratios of the maximum diameter of cavity 3 and the maximum diameter of opening 4 with respect to that of composite particle 5 are excessively small, there is a problem similar to that of cell C. In addition, cavity 3 for absorbing volume change of active material 1 is excessively small. Therefore, the cycle characteristic is also low.

Next, the study result of the mixing ratio of conductive agent 2 to active material 1 is described. In preparing samples 32 through 36, active material 1 synthesized so as to have an average maximum diameter of 0.5 μm by a method similar to that of sample 16 is used. Such active material 1 and AB as conductive agent 2 are put into aqueous solution of polyacrylic acid as the binding agent and sufficiently dispersed, and mixed dispersion liquid 7 as a raw material of composite particle 5 is prepared. Respective mixing ratios of AB to the active material of 100 parts-by-weight are 1, 2, 25, 50 and 55 parts-by-weight, and the mixing ratio of solid content of the polyacrylic acid to the active material of 100 parts-by-weight is 10 parts-by-weight. Further, by adding water as dispersion medium 6, solid content weight percent of mixed dispersion liquid 7 is adjusted to 5%, hence five kinds of mixed dispersion liquid 7 are obtained. Using these kinds of mixed dispersion liquid 7, composite particles 5 of samples 32 through 36 are prepared similarly to sample 1. Table 3 shows physical properties of each composite particle 5.

TABLE 3

| Composite particle No. | Content of conductive agent (parts-by-weight) | Maximum diameter of composite particle (μm) | Maximum diameter ratio of cavity/composite particle (%) | Maximum diameter ratio of opening/composite particle (%) |
|---|---|---|---|---|
| 32 | 1 | 6 | 18 | 15 |
| 33 | 2 | 6 | 20 | 16 |
| 34 | 25 | 7 | 45 | 32 |
| 35 | 50 | 10 | 75 | 47 |
| 36 | 55 | broken | broken | broken |

Using samples 32 through 36, model cells of cells L through P are produced similarly to cell A. Cells L through P are evaluated by a method similar to that of cell A. Table 4 shows the evaluation results.

TABLE 4

| Cell No. | Composite particle No. | High-rate discharge characteristic (%) | High-rate charge characteristic (%) | Cycle characteristic (%) |
|---|---|---|---|---|
| L | 32 | 34 | 38 | 51 |
| M | 33 | 53 | 55 | 71 |
| N | 34 | 66 | 68 | 90 |
| O | 35 | 71 | 74 | 94 |
| P | 36 | — | — | — |

A shown in Tables 3 and 4, it is considered that, when AB of 20 through 50 parts-by-weight is mixed into active material 1 of 100 parts-by-weight, the maximum diameter of cavity 3 is 20 through 80% of that of composite particle 5, and the maximum diameter of opening 4 is 15 through 80% of that of composite particle 5. However, the composite particle of sample 36, which is out of the range, is broken. The maximum diameters of cavity 3 and opening 4 are small in sample 32. Therefore, cells P and L employing respective sample 36 and sample 32, respectively, have low battery characteristics.

Next, the study results of the kinds of active materials are described. In producing samples 37 through 41, Si powder, Sn powder, SiO powder, SnO powder, and $Cu_6Sn_5$ powder are used as active materials 1. These kinds of powder are crushed using a vibration mill and a bead mill device, and classified to set the average maximum diameter at 0.5 μm. Composite particles 5 of samples 37 through 41 are prepared in a method similar to that of sample 16 except for this process. Table 5 shows physical properties of each composite particle 5.

TABLE 5

| Composite particle No. | Active material | Maximum diameter of active material (μm) | Maximum diameter of composite particle (μm) | Maximum diameter ratio of cavity/composite particle (%) | Maximum diameter ratio of opening/composite particle (%) |
|---|---|---|---|---|---|
| 37 | Si | 0.5 | 7 | 45 | 32 |
| 38 | Sn | 0.5 | 6.3 | 47 | 33 |
| 39 | SiO | 0.5 | 6.6 | 46 | 32 |
| 40 | SnO | 0.5 | 6.2 | 48 | 35 |
| 41 | $Cu_6Sn_5$ | 0.5 | 6.3 | 47 | 33 |

Using samples 37 through 41, model cells of cells Q through U are produced similarly to cell A. Cells Q through U are evaluated by a method similar to that of cell A. Table 6 shows the evaluation results.

TABLE 6

| Cell No. | Composite particle No. | High-rate discharge characteristic (%) | High-rate charge characteristic (%) | Cycle characteristic (%) |
|---|---|---|---|---|
| Q | 37 | 64 | 66 | 89 |
| R | 38 | 65 | 67 | 90 |
| S | 39 | 64 | 66 | 89 |
| T | 40 | 65 | 67 | 90 |
| U | 41 | 65 | 67 | 90 |

As shown in Tables 5 and 6, even when not only Si-containing alloy, but also Si, Si oxide, Sn, Sn-containing alloy, and Sn oxide are used as active materials 1, an equivalent and preferable advantage is obtained.

Next, the study results of the kinds and contents of the metals contained when Si-containing alloy is used as active material 1 are described. In preparing samples 42 through 47, using the mechanical alloying method similarly to sample 16, alloys of 9 wt % Ti-91 wt % Si, 41 wt % Ti-59 wt % Si, 22 wt % Fe-78 wt % Si, 22 wt % Co-78 wt % Si, 23 wt % Ni-77 wt % Si, and 23 wt % Cu-77 wt % Si are synthesized. An electron diffraction method employing a transmission electron microscope device shows that the synthesized alloys have two phases of an $MSi_2$ alloy and Si. The active material powder is crushed using the vibration mill and the bead mill device, and classified to set the average maximum diameter at 0.5 μm. Composite particles 5 of samples 42 through 47 are prepared in a method similar to that of sample 16 except for use of active materials 1. Table 7 shows physical properties of each composite particle 5.

TABLE 7

| Composite particle No. | Active material | Maximum diameter of active material (μm) | Maximum diameter of composite particle (μm) | Maximum diameter ratio of cavity/composite particle (%) | Maximum diameter ratio of opening/composite particle (%) |
|---|---|---|---|---|---|
| 42 | Ti9%—Si91% | 0.5 | 7.1 | 44 | 31 |
| 43 | Ti41%—Si59% | 0.5 | 6.5 | 46 | 32 |
| 44 | Fe22%—Si78% | 0.5 | 7 | 45 | 32 |
| 45 | Co22%—Si78% | 0.5 | 7 | 45 | 32 |
| 46 | Ni23%—Si77% | 0.5 | 7 | 45 | 32 |
| 47 | Cu23%—Si77% | 0.5 | 7 | 45 | 32 |

Using samples 42 through 47, model cells of cells V through AA are produced similarly to cell A. Cells V through AA are evaluated by a method similar to that of cell A. Table 8 shows the evaluation results.

TABLE 8

| Cell No. | Composite particle No. | High-rate discharge characteristic (%) | High-rate charge characteristic (%) | Cycle characteristic (%) |
|---|---|---|---|---|
| V | 42 | 63 | 65 | 90 |
| W | 43 | 65 | 67 | 88 |
| X | 44 | 63 | 65 | 88 |
| Y | 45 | 63 | 66 | 89 |
| Z | 46 | 64 | 66 | 89 |
| AA | 47 | 60 | 62 | 87 |

As shown in Tables 7 and 8, even when any M—Si alloy is used as the active material, an equivalent and preferable advantage is obtained. This advantage is equivalent even when composition ratio of metal M (M is Ti, Fe, Co, Ni, or Cu) to Si is changed, as shown in cells V and W.

All of the above-mentioned examples show negative electrode active materials, but the efficiency characteristic is increased when $LiNi_{1-x}M_xO_2$ (M is Mn, Co, Mg, or Al, and $0 \leq x \leq 0.8$) is used as a positive electrode active material and is made into composite particles.

As described above, a lithium rechargeable battery employing a composite particle of the present invention has high energy density, high cycle characteristic, and high high-rate charge and discharge characteristics, and is useful as a power source of a portable device such as a portable phone and a notebook computer.

What is claimed is:

1. A composite particle for a lithium rechargeable battery, the composite particle being contained in at least one of a positive electrode and a negative electrode of the lithium rechargeable battery, and being formed of a hollow body having an outer wall that includes a conductive agent and a plurality of active material particles capable of reversibly storing and emitting a lithium ion, wherein an inside of the outer wall is provided with a cavity capable of retaining non-aqueous electrolytic solution, and the outer wall is provided with an opening that allows the non-aqueous electrolytic solution to come into and go out of the cavity and communicates with the cavity, wherein, the opening is at least 15% and at most 80% of the maximum diameter of the composite particle.

2. The composite particle for the lithium rechargeable battery according to claim 1, wherein a maximum diameter of the cavity is at least 20% and at most 80% of a maximum diameter of the composite particle.

3. The composite particle for the lithium rechargeable battery according to claim 1, wherein an average maximum diameter of the active material is at least 0.05 μm and at most 1 μm.

4. The composite particle for the lithium rechargeable battery according to claim 1, wherein the conductive agent of 2 through 50 parts-by-weight is contained in the active material of 100 parts-by-weight.

5. The composite particle for the lithium rechargeable battery according to claim 1, wherein the composite particle is contained in the negative electrode, and the active material is at least one selected from silicon, silicon-containing alloy, oxide mainly containing silicon, tin, tin-containing alloy, and oxide mainly containing tin.

6. The composite particle for the lithium rechargeable battery according to claim 5, wherein the silicon-containing alloy contains at least one metal selected from titanium, iron, cobalt, nickel, and copper.

* * * * *